(12) United States Patent
Jain et al.

(10) Patent No.: US 9,407,391 B2
(45) Date of Patent: Aug. 2, 2016

(54) USER EQUIPMENT POWER SAVINGS FOR MACHINE TYPE COMMUNICATIONS

(71) Applicant: Intel Corporation, Santa Clara, CA (US)

(72) Inventors: Puneet Jain, Hillsboro, OR (US); Sangeetha L. Bangolae, Beaverton, OR (US); Marta Martinez Tarradell, Hillsboro, OR (US); Mo-Han Fong, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/718,334

(22) Filed: Dec. 18, 2012

(65) Prior Publication Data

US 2013/0301499 A1 Nov. 14, 2013

Related U.S. Application Data

(60) Provisional application No. 61/646,223, filed on May 11, 2012.

(51) Int. Cl.
*H04W 52/02* (2009.01)
*H04J 3/16* (2006.01)
(Continued)

(52) U.S. Cl.
CPC ............ *H04J 3/1694* (2013.01); *H04B 1/56* (2013.01); *H04B 7/024* (2013.01); *H04B 7/0456* (2013.01); *H04B 7/0473* (2013.01);
(Continued)

(58) Field of Classification Search
CPC ..... H04W 16/14; H04W 36/00; H04W 72/02; H04W 76/048; H04W 88/06
See application file for complete search history.

(56) References Cited

U.S. PATENT DOCUMENTS

2009/0122736 A1* 5/2009 Damnjanovic et al. ....... 370/311
2009/0221284 A1* 9/2009 Kim et al. .................. 455/426.1
(Continued)

FOREIGN PATENT DOCUMENTS

CN 104396313 A1 3/2015
CN 105359059 A 2/2016
(Continued)

OTHER PUBLICATIONS

"Evolved Universal Terrestrial Radio Access (E-UTRA) and Evolved Universal Terrestrial Radio Access Network (E-UTRAN); Overall description; Stage 2", 3GPP TS 36.300 version 10.8.0 Release 10. ETSI TS 136 300. LTE., (Jul. 2012), 210 pgs.
(Continued)

*Primary Examiner* — David Oveissi
(74) *Attorney, Agent, or Firm* — Schwegman Lundberg & Woessner, P.A.

(57) ABSTRACT

Embodiments of user equipment (UE) and base stations (eNodeB) and method for reducing power consumption in UE in a wireless network are generally described herein. In some embodiments, characteristics of UE including mobility, communication data load, and communication type are used by base stations, MME or other controlling entities to configure power saving features of the UE. Power saving features can include a new Radio Resource Control (RRC) layer state where circuitry is powered off for extended periods of time, extended Discontinuous Reception (DRX) cycles, reduced workloads in existing RRC, EPC Connection Management (ECM) and/or EPS Mobility Management (EMM) states or combinations thereof.

25 Claims, 5 Drawing Sheets

(51) Int. Cl.
| | |
|---|---|
| H04B 7/26 | (2006.01) |
| H04W 36/00 | (2009.01) |
| H04W 24/10 | (2009.01) |
| H04W 72/04 | (2009.01) |
| H04W 72/08 | (2009.01) |
| H04J 3/00 | (2006.01) |
| H04B 1/56 | (2006.01) |
| H04W 56/00 | (2009.01) |
| H04W 76/02 | (2009.01) |
| H04W 4/22 | (2009.01) |
| H04W 36/22 | (2009.01) |
| H04B 15/00 | (2006.01) |
| H04W 76/04 | (2009.01) |
| H04B 7/02 | (2006.01) |
| H04B 7/04 | (2006.01) |
| H04B 7/06 | (2006.01) |
| H04W 24/02 | (2009.01) |
| H04W 72/12 | (2009.01) |
| H04L 29/02 | (2006.01) |
| H04W 4/00 | (2009.01) |
| H04W 4/06 | (2009.01) |
| H04W 48/20 | (2009.01) |
| H04W 16/14 | (2009.01) |
| H04L 29/06 | (2006.01) |
| H04W 4/02 | (2009.01) |
| H04J 3/26 | (2006.01) |
| H04L 27/26 | (2006.01) |
| H04W 72/10 | (2009.01) |
| H04L 5/00 | (2006.01) |
| H04L 5/14 | (2006.01) |
| H04W 36/32 | (2009.01) |
| H04W 4/16 | (2009.01) |
| H04W 36/04 | (2009.01) |
| H04W 36/16 | (2009.01) |
| H04W 72/00 | (2009.01) |
| H04W 36/30 | (2009.01) |
| H04W 36/18 | (2009.01) |
| H04W 88/06 | (2009.01) |
| H04W 72/02 | (2009.01) |
| H04L 1/00 | (2006.01) |
| H04L 1/18 | (2006.01) |
| H04W 88/02 | (2009.01) |
| H04W 88/08 | (2009.01) |

(52) U.S. Cl.
CPC ............. *H04B 7/0486* (2013.01); *H04B 7/063* (2013.01); *H04B 7/065* (2013.01); *H04B 7/0626* (2013.01); *H04B 7/0632* (2013.01); *H04B 7/0639* (2013.01); *H04B 7/0647* (2013.01); *H04B 7/26* (2013.01); *H04B 15/00* (2013.01); *H04J 3/00* (2013.01); *H04J 3/26* (2013.01); *H04L 5/001* (2013.01); *H04L 5/0007* (2013.01); *H04L 5/0035* (2013.01); *H04L 5/0096* (2013.01); *H04L 5/14* (2013.01); *H04L 5/1469* (2013.01); *H04L 27/2627* (2013.01); *H04L 29/02* (2013.01); *H04L 69/22* (2013.01); *H04W 4/005* (2013.01); *H04W 4/023* (2013.01); *H04W 4/06* (2013.01); *H04W 4/16* (2013.01); *H04W 4/22* (2013.01); *H04W 16/14* (2013.01); *H04W 24/02* (2013.01); *H04W 24/10* (2013.01); *H04W 36/00* (2013.01); *H04W 36/0061* (2013.01); *H04W 36/0088* (2013.01); *H04W 36/04* (2013.01); *H04W 36/16* (2013.01); *H04W 36/22* (2013.01); *H04W 36/32* (2013.01); *H04W 48/20* (2013.01); *H04W 52/0212* (2013.01); *H04W 52/0216* (2013.01); *H04W 52/0225* (2013.01); *H04W 52/0229* (2013.01); *H04W 52/0235* (2013.01); *H04W 52/0251* (2013.01); *H04W 56/00* (2013.01); *H04W 56/001* (2013.01); *H04W 72/005* (2013.01); *H04W 72/042* (2013.01); *H04W 72/044* (2013.01); *H04W 72/0413* (2013.01); *H04W 72/0426* (2013.01); *H04W 72/082* (2013.01); *H04W 72/085* (2013.01); *H04W 72/10* (2013.01); *H04W 72/12* (2013.01); *H04W 72/1215* (2013.01); *H04W 76/023* (2013.01); *H04W 76/027* (2013.01); *H04W 76/046* (2013.01); *H04W 76/048* (2013.01); *H04L 1/0026* (2013.01); *H04L 1/1803* (2013.01); *H04L 1/1822* (2013.01); *H04L 5/0053* (2013.01); *H04L 5/0073* (2013.01); *H04W 36/18* (2013.01); *H04W 36/30* (2013.01); *H04W 72/02* (2013.01); *H04W 72/1226* (2013.01); *H04W 88/02* (2013.01); *H04W 88/06* (2013.01); *H04W 88/08* (2013.01); *Y02B 60/50* (2013.01)

(56) References Cited

U.S. PATENT DOCUMENTS

| | | | |
|---|---|---|---|
| 2011/0276816 A1 | 11/2011 | Cooper et al. | |
| 2011/0299485 A1 | 12/2011 | Hannu et al. | |
| 2012/0023355 A1 | 1/2012 | Song et al. | |
| 2012/0069823 A1* | 3/2012 | Low et al. | 370/335 |
| 2012/0106370 A1* | 5/2012 | Radulescu et al. | 370/252 |
| 2012/0106456 A1* | 5/2012 | Jin et al. | 370/328 |
| 2012/0155351 A1* | 6/2012 | Lee et al. | 370/311 |
| 2012/0275365 A1* | 11/2012 | Anderson et al. | 370/311 |
| 2012/0275366 A1 | 11/2012 | Anderson et al. | |
| 2013/0028235 A1 | 1/2013 | Barrett | |
| 2013/0077594 A1 | 3/2013 | Park et al. | |
| 2013/0194941 A1 | 8/2013 | Lu et al. | |
| 2013/0260811 A1* | 10/2013 | Rayavarapu | 455/509 |
| 2014/0003348 A1 | 1/2014 | Velev et al. | |
| 2014/0335867 A1 | 11/2014 | Hsu et al. | |
| 2015/0043403 A1 | 2/2015 | Martinez Tarradell et al. | |
| 2015/0257094 A1 | 9/2015 | Wei et al. | |

FOREIGN PATENT DOCUMENTS

| | | |
|---|---|---|
| JP | 2007053628 A | 3/2007 |
| JP | 2010519793 A | 6/2010 |
| JP | 2011039498 A | 2/2011 |
| JP | 2012010202 A | 1/2012 |
| JP | 2012178642 A | 9/2012 |
| JP | 2015515241 A | 5/2015 |
| KR | 1020090087098 A | 8/2009 |
| KR | 1020090106603 A | 10/2009 |
| KR | 1020110000479 A | 1/2011 |
| KR | 102011008110 A | 7/2011 |
| KR | 102016002118 A | 2/2016 |
| NO | WO-2013048193 A1 | 4/2013 |
| WO | WO-2011083997 A2 | 7/2011 |
| WO | WO-2011100570 A1 | 8/2011 |
| WO | WO-2012023280 A1 | 2/2012 |
| WO | WO-2012136311 A1 | 10/2012 |
| WO | WO-2013169789 A1 | 11/2013 |
| WO | WO-2015021284 A1 | 2/2015 |

OTHER PUBLICATIONS

"Evolved Universal Terrestrial Radio Access (E-UTRA); Radio Resource Control (RRC); Protocol specification", 3GPP TS 36.331 version 10.6.0 Release 10. ETSI TS 136 331. LTE, (Jul. 2012), 306 pgs.

"Evolved Universal Terrestrial Radio Access (E-UTRA); Requirements for support of radio resource management", 3GPP TS 36.133 version 10.7.0 Release 10. ETSI TS 136 133. LTE., (Jul. 2012), 661 pgs.

(56) References Cited

OTHER PUBLICATIONS

"Evolved Universal Terrestrial Radio Access (E-UTRA); User Equipment (UE) procedures in idle mode", 3GPP TS 36.304 version 10.6.0 Release 10. ETSI TS 136 304. LTE., (Jul. 2012), 35 pgs.
"International Application Serial No. PCT/US2013/039963, International Search Report mailed Jun. 12, 2013", 5 pgs.
"International Application Serial No. PCT/US2013/039963, Written Opinion mailed Jun. 12, 2013", 6 pgs.
"Long Term Evolution (LTE): A Technical Overview", Technical White Paper., (Jun. 19, 2007), 15 pgs.
"Long Term Evolution Protocol Overview", White Paper., [Online]. Retrieved from the Internet: <URL: http://www.freescale.com/files/wireless_comm/doc/white_paper/LTEPTCLOVWWP.pdf>, (Oct. 2008), 21 pgs.
"Service requirements for Machine-Type Communications (MTC); Stage 1", 3GPP TS 22.368 version 10.5.0 Release 10. ETSI TS 122 368. Digital cellular telecommunications system (Phase 2+). Universal Mobile Telecommunications System (UMTS). LTE., (Jul. 2011), 18 pgs.
"WirelessMoves: Thoughts on the evolution of wireless networks and mobile web 2.0", [Online]. Retrieved from the Internet: <URL: http://mobilesociety.typepad.com/mobile_life/2009/02/sae-review-part-2-mobility-and-connection-management.html>, (Feb. 4, 2009), 3 pgs.
Cho, Bong Youl (Brian), "LTE RRC/RRM", TTA LTE/MIMO Standards/Technology Training. Nokia Siemens Networks., (May 2012), 30 pgs.
Andreev, S., et al., "Efficient small data access for machine-type communications in LTE", 2013 IEEE International Conference on Communications (ICC), (2013), 3569-3574.
"International Application Serial No. PCT/US2013/039963, International Preliminary Report on Patentability mailed Nov. 20, 2014", 8 pgs.
"International Application Serial No. PCT/US2014/050159, International Search Report mailed Nov. 18, 2014", 3 pgs.
"International Application Serial No. PCT/US2014/050159, Written Opinion mailed Nov. 18, 2014", 7 pgs.
"European Application Serial No. 13786929.3, Extended European Search Report mailed Nov. 17, 2015", 12 pgs.
Nokia, "DRX parameters in LTE", 3GPP Draft; R2-071285 DRX Paramet Ers in E-UTRAN, 3rd Generation Partnership Project (3GPP), Mobile Competence Centre 650, Route Des Lucioles ; F-06921 Sophia-Antipolis Cedex ; France, vol. RAN WG2, No. St. Julian, (Mar. 22, 2007).
Nokia, "Mobility Management in LTE_IDLE state", 3GPP Draft; S2-06O688 IDLE, 3rd Generation Partnership Project (3GPP), Mobile Competence Centre ; 650, Route Des Lucioles ; F-06921 Sophia-Antipolis Cedex ; France, vol. SA WG2, No. (Feb. 7, 2006).

Nokia Siemens Networks, et al., "UE power saving and fast dormancy in LTE network", 3GPP Draft; R2-104783 (Battery Saving), 3rd Generation Partnership Project (3GPP), Mobile Competence Centre ; 650, Route Des Lucioles ; F-06921 Sophia-Antipolis Cedex ; France, vol. RAN WG2, No. Madrid, Spain, (Aug. 16, 2010).
"U.S. Appl. No. 14/318,085, Non Final Office Action mailed Oct. 8, 2015", 14 pgs.
"Japanese Application Serial No. 2015-509219, Office Action mailed Sep. 15, 2015", W/ English Translation, 6 pgs.
"Korean Application Serial No. 2014-7031575, Office Action mailed Aug. 17, 2015", W/ English Translation, 12 pgs.
"Korean Application Serial No. 2014-7031575, Response filed Oct. 19, 2015 to Office Action mailed Aug. 17, 2015", W/ English Claims, 36 pgs.
Australian Application Serial No. 2013259726, Response filed Feb. 18, 2016 to First Examiner Report mailed Apr. 14, 2015, 9 pgs.
Australian Application Serial No. 2013259726, Response filed Mar. 31, 2016 to Subsequent Examiners Report mailed Mar. 29, 2016, 6 pgs.
Australian Application Serial No. 2013259726, Subsequent Examiners Report mailed Mar. 29, 2016, 2 pgs.
Canadian Application Serial No. 2,871,087, Office Action mailed Feb. 24, 2016, 4 pgs.
International Application Serial No. PCT7US2014/050159, International Preliminary Report on Patentability mailed Feb. 18, 2016, 9 pgs.
Japanese Application Serial No. 2015-509219, Notice of Reasons for Rejection mailed Mar. 22, 2016, (English Translation), 3 pgs.
Japanese Application Serial No. 2015-509219, Response filed Jan. 28, 2016 to Office Action mailed Sep. 15, 2015, w/English Translation of Claims, 18 pgs (received by Office Jan. 28, 2016).
Korean Application Serial No. 2014-7031575, Reasons for Rejection mailed Feb. 22, 2016, (English Translation), 11 pgs.
Alcatel-Lucent, Shanghai Bell, et al., "Discussion on MTC Idle states", 3GPP TSG-WG #69-bis R2-102033, [Online]. Retrieved from the Internet: <http://www.3gpp.org/ftp/tsg_ran/WG2_RL2/TSGR2_69bis/Docs/R2-102033.zip>, (Apr. 1, 2010).
U.S. Appl. No. 14/318,085, Response filed Mar. 7, 2016 to Non Final Office Action mailed Oct. 8, 2015, 13 pgs.
U.S. Appl. No. 14/318,085, Final Office Action mailed May 25, 2016, 15 pgs.
Japanese Application Serial No. 2015-509219, Response filed Apr. 1, 2016 to Notice of Reasons for Rejection mailed Mar. 22, 2016, 8 pgs.
Korean Application Serial No. 2014-7031575, Response filed Apr. 22, 2016 to Reasons for Rejection mailed Feb. 22, 2016, (English Translation of Claims), 30 pgs (W/ concise explanation of relevance).
Mexican Application Serial No. MX/a/2014/013757, Office Action mailed Apr. 29, 2016, W/ No Translation, 3 pgs (W/ concise explanation of relevance).

\* cited by examiner

USER EQUIPMENT POWER SAVINGS FOR MACHINE TYPE COMMUNICATIONS

PRIORITY CLAIM

This application claims priority under 35 USC 119 to U.S. Provisional Patent Application Ser. No. 61/646,223, filed May 11, 2012 which is incorporated herein by reference in its entirety.

TECHNICAL FIELD

Embodiments pertain to wireless cellular communications. More particularly, embodiments relate to saving power in User Equipment (UE).

BACKGROUND

An ongoing problem in devices that connect to wireless networks is to reduce power consumption during operation. This is particularly true for devices that rely on batteries for their primary power source. However, there is always a tradeoff between power savings and other considerations such as data throughput or adherence to standards such as the current $3^{rd}$ Generation Partnership Project (3GPP) long term evolution (LTE) standard.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Various modifications to the embodiments will be readily apparent to those skilled in the art, and the generic principles defined herein may be applied to other embodiments and applications without departing from the scope of the invention. Moreover, in the following description, numerous details are set forth for the purpose of explanation. However, one of ordinary skill in the art will realize that embodiments of the invention may be practiced without the use of these specific details. In other instances, well-known structures and processes are not shown in block diagram form in order not to obscure the description of the embodiments of the invention with unnecessary detail. Thus, the present disclosure is not intended to be limited to the embodiments shown, but is to be accorded the widest scope consistent with the principles and features disclosed herein.

Figure 1:
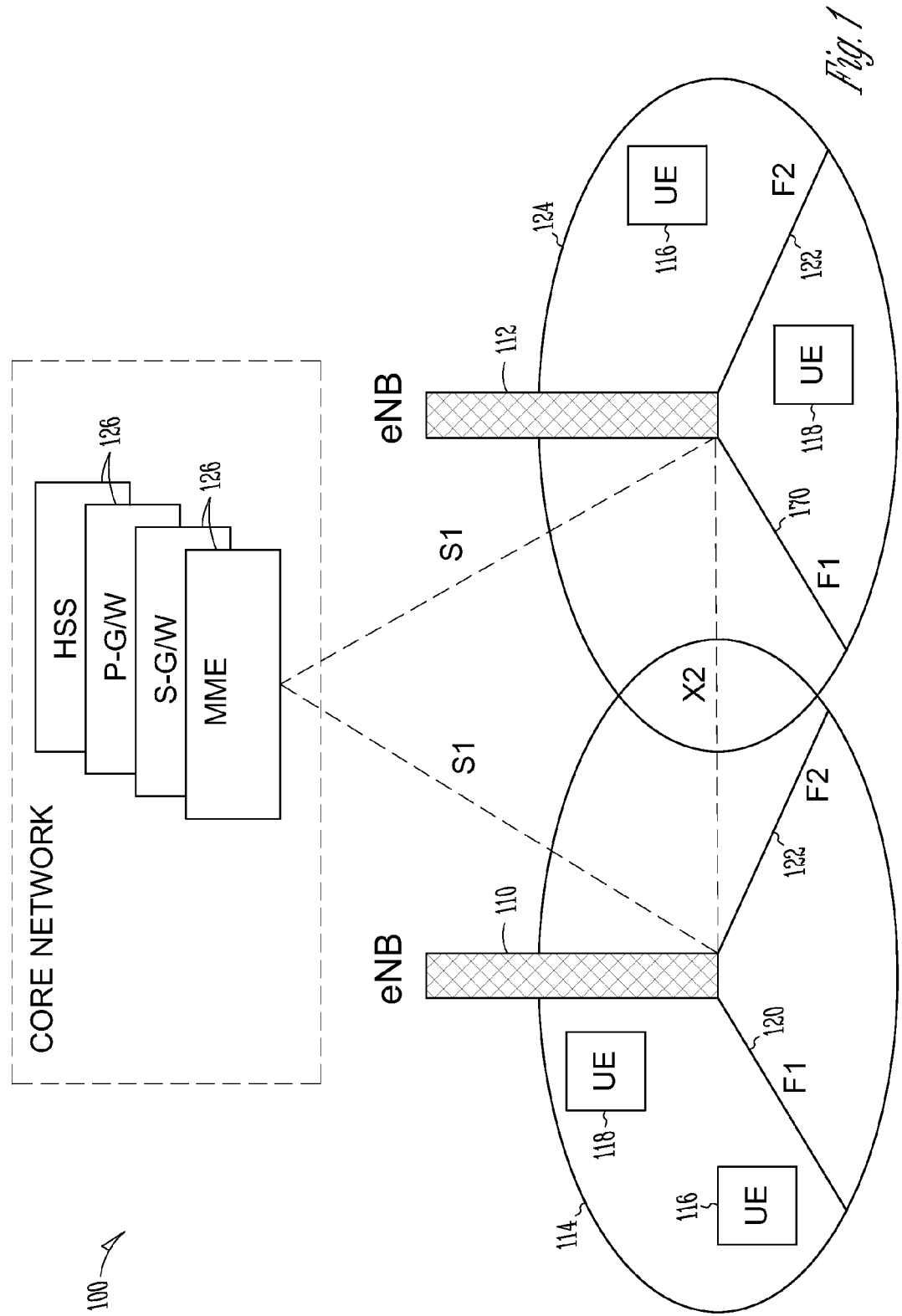
FIG. 1 illustrates cellular communications in accordance with some embodiments.

FIG. 1 illustrates an example (portion) of a wireless communications network 100 shown in a homogeneous network deployment according to some embodiments. In one embodiment, the wireless communications network 100 comprises an evolved universal terrestrial radio access network (EU-TRAN) using the 3rd Generation Partnership Project (3GPP) long-term evolution (LTE) standard.

The wireless communications network 100 includes a first enhanced Node B (eNodeB or eNB or base station) 110 and a second eNodeB 112.

The first eNodeB 110 (also referred to as eNodeB1, eNB1, a first base station, or a first macro base station) serves a certain geographic area that includes at least a first cell 114. A plurality of UEs 116, 118 located within the first cell 114 is served by the first eNodeB 110. The first eNodeB 110 communicates with the UEs 116, 118 on a first carrier frequency 120 (F1) and optionally, one or more secondary carrier frequencies, such as a second carrier frequency 122 (F2).

The second eNodeB 112 is similar to the first eNodeB 110 except it serves a different cell from that of the first eNodeB 110. The second eNodeB 112 (also referred to as eNodeB2, eNB2, a second base station, or a second macro base station) serves another certain geographic area that includes at least a second cell 124. The plurality of UEs 116, 118 located within the second cell 124 is served by the second eNodeB 112. The second eNodeB 112 communicates with the UEs 116, 118 on the first carrier frequency 120 (F1) and optionally, one or more secondary carrier frequencies, such as the second carrier frequency 122 (F2).

The first and second cells 114, 124 may or may not be immediately co-located next to each other. However, the first and second cells 114, 124 may be situated close enough to be considered neighboring cells, such that the user traffic pattern and UL/DL configuration of one of the first or second cells 114, 124 may be relevant to the other cell. For example, one of the UE 116, 118 served by the first eNodeB 110 may move from the first cell 114 to the second cell 124, in which case a hand-off takes places from the first eNodeB 110 to the second eNodeB 112 with respect to the particular UE 116, 118. Further, the inter-cell interference characteristics can be affected by the UL/DL configurations in the respective cells. As another example, the respective coverage areas of the first and second cells 114, 124 may be distinct or isolated from each other.

The UEs 116, 118 may comprise a variety of devices that communicate within the wireless communications network 100 including, but not limited to, cellular telephones, smart phones, tablets, laptops, desktops, personal computers, servers, personal digital assistants (PDAs), web appliances, set-top box (STB), a network router, switch or bridge, and the like. The UEs 116, 118 can comprise Release 8, 9, 10, 11, and/or later releases. Furthermore, UEs 116, 118 may comprise various characteristics pertaining to mobility, communication data load, and communication type. Mobility, for example, may be that normally associated with movable devices such as smart phones or the like (e.g. "normal" mobility), or may be more infrequent or nomadic where mobility occurs occasionally, if at all, perhaps such as a smart meter, or even stationary. Communication data load may be characterized with that typically associated with any UE device. For example, mobile phones, personal computers, etc. all have typical or "normal" data characteristics (which may, none the less, vary significantly individual device to individual device). Other devices, such as smart meters or the like, may have only infrequent periods of small amounts of data to be sent and/or received (e.g. "limited" data characteristics). Communication type may be adapted specifically, as in the case of machine type communications (MTC) or may be more general, such as that used by a phone where some may be more MTC type of communication and other may carry voice or other data (e.g. human type communications where a person initiates the call or data transfer instead of a machine).

Wireless communication network 100 may also include other elements, for example one or more Mobility Management Entities (MME), Packet Data Network (PDN) Gateway (P-GW), Serving Gateways (S-GW), Home Subscriber Servers (HSS) or other network operators or entities. These are illustrated in FIG. 1 as MME, P-GW, S-GW, HSS 126 and indicate that these, or other network operator or entities can interact with entities within wireless communication network 100, including, without limitation, eNodeBs 110, 112, UEs 116, 118 or other entities. Given their ability to control various aspects of the network or entities within the network, MMEs, P-GW, S-GW, HSS, network operators, eNodeBs or other such entities are sometimes referred to herein as a "controlling entity".

In FIG. 1, MME and S-GW are connected to eNodeBs (e.g. eNB 110, 112) through S1-MME (for control) and S1-U (for user data), respectively. In FIG. 1, these simply labeled S1, for simplicity. Similarly, other interfaces exist that are not explicitly shown. S-GW and P-GW are connected by an S5 interface. MME and HSS are connected by S6a, and UE and eNB are connected by LTE-Uu (e.g. air interface). The interface connecting eNB 110 and 112 is illustrated in FIG. 1 as X2.

It is understood that the wireless communications network 100 includes more than two eNodeBs. It is also understood that each of the first and second cells 114, 124 can have more than one neighboring eNodeB. As an example, cell 114 may have six or more neighboring macro cells.

In one embodiment, the UEs 116, 118 located in respective first or second cells 114, 124 transmits data to its respective first or second eNodeB 110, 112 (uplink transmission) and receives data from its respective first or second eNodeB 110, 112 (downlink transmission) using radio frames comprising Orthogonal Frequency-Division Multiple Access (OFDMA) frames configured for time division duplexing (TDD) or frequency division duplexing (FDD) operations. Depending on the exact configuration, the downlink and uplink communication opportunity (subframe or slots) for an eNodeB to communicate information to a particular UE will happen at different instants.

Figure 2:
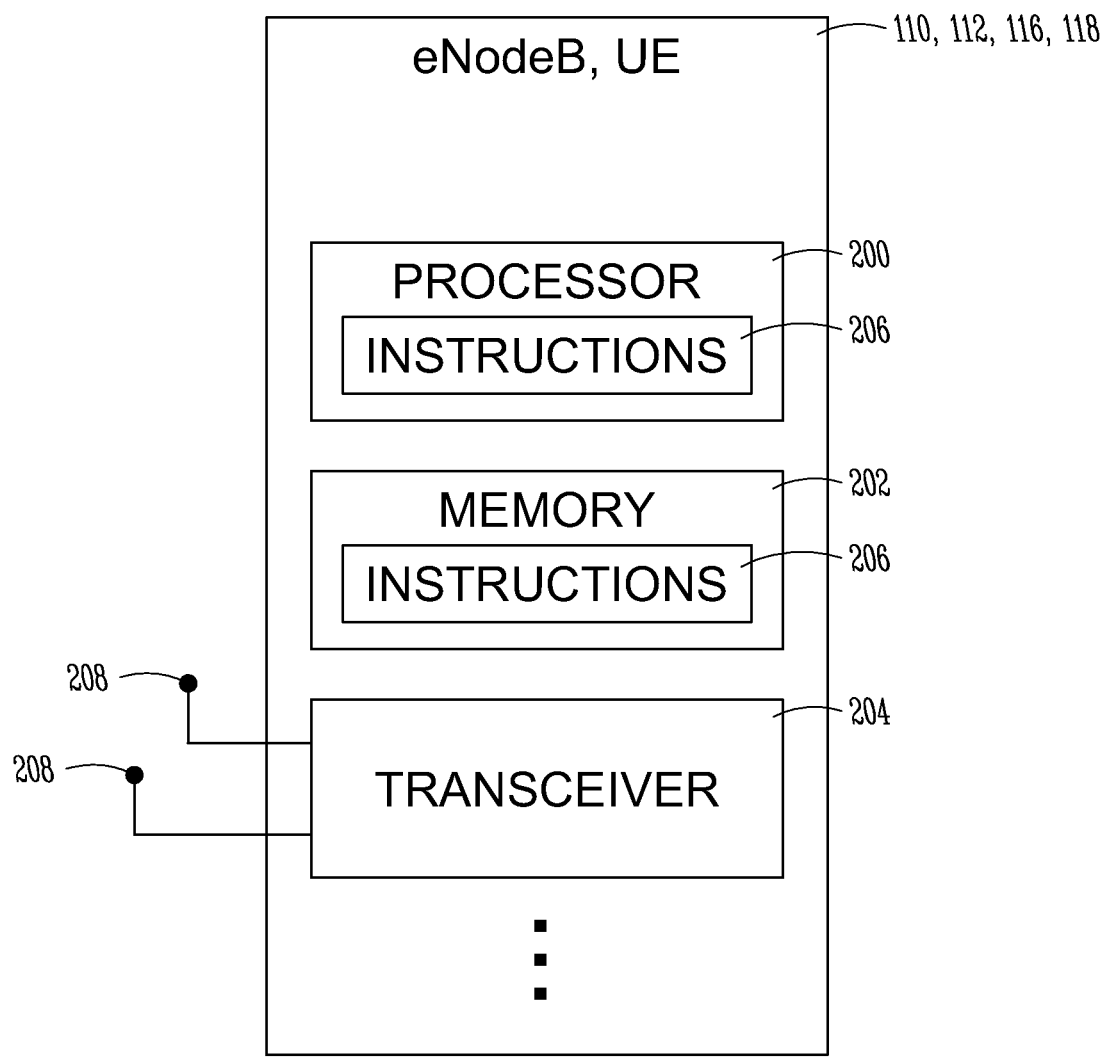
FIG. 2 is a block diagram of user equipment (UE) in accordance with some embodiments.

FIG. 2 illustrates an example block diagram showing details of each of eNodeBs 110, 112 and UE 116, 118 according to some embodiments. In these examples, eNodeBs 110, 112 and UE 116, 118 include a processor 200, a memory 202, a transceiver 204, one or more antennas 208, instructions 206, and possibly other components (not shown) which may depend on whether the devices is an eNodeB or a UE. While similar from a block diagram standpoint, it will be apparent to those of skill in the art that the configuration and details of operation of eNodeBs 110, 112 and UE 116, 118 are substantially different, as described herein.

The eNodeBs 110, 112 can be similar to each other in hardware, firmware, software, configurations, and/or operating parameters. Differences can also exist, depending on exact configuration and other factors. Similarly, UE 116 and 118 can be similar to each other in hardware, firmware, software, configurations, and/or operating parameters, although differences can also exist. In one example, UE 116 and 118 are similar, while in another example, UE 116 can represent one type of UE, such as a cellular telephone, smart phone, tablet, laptop, desktop, personal computer, server, PDA, web appliance, STB, network router, switch or bridge, or the like, while UE 118 can comprise a different type of device, such as a smart meter with different characteristics in terms of mobility (e.g. nomadic), communication data load (e.g. infrequent periods of low amounts of data transfer), and/or communication type (e.g. MTC).

The processor 200 comprises one or more central processing units (CPUs), graphics processing units (GPUs), accelerated processing units (APUs), or various combinations thereof. The processor 200 provides processing and control functionalities for the eNodeB or the UE, depending on the device. Memory 202 comprises one or more transient and static memory units configured to store instructions and data for the eNodeB or UE. The transceiver 204 comprises one or more transceivers including, for an appropriate eNodeB or UE, and at least one antenna 208 such as a multiple-input and multiple-output (MIMO) antenna to support MIMO communications. For eNodeBs, the transceiver 204 receives uplink transmissions and transmits downlink transmissions, among other things, from and to the UEs respectively. For UE, the transceiver 204 receives transmissions from eNodeBs (or other UE in direct link communications) and transmits data back to eNodeBs (or other UE in direct link communications).

The instructions 206 comprises one or more sets of instructions or software executed on a computing device (or machine) to cause such computing device (or machine) to perform any of the methodologies discussed herein. The instructions 206 (also referred to as computer- or machine-executable instructions) may reside, completely or at least partially, within the processor 200 and/or the memory 202 during execution thereof by the eNodeB, or UE depending on the device. The processor 200 and memory 202 also comprise machine-readable media.

In FIG. 2, processing and control functionalities are illustrated as being provided by processor 200 along with associated instructions 206. However, these are only examples of processing circuitry that comprise programmable logic or circuitry (e.g., as encompassed within a general-purpose processor or other programmable processor) that is temporarily configured by software or firmware to perform certain operations. In various embodiments, processing circuitry may comprise dedicated circuitry or logic that is permanently configured (e.g., within a special-purpose processor, application specific integrated circuit (ASIC), or array) to perform certain operations. It will be appreciated that a decision to implement a processing circuitry mechanically, in dedicated and permanently configured circuitry, or in temporarily configured circuitry (e.g., configured by software) may be driven by, for example, cost, time, energy-usage, package size, or other considerations.

Accordingly, the term "processing circuitry" should be understood to encompass a tangible entity, be that an entity that is physically constructed, permanently configured (e.g., hardwired), or temporarily configured (e.g., programmed) to operate in a certain manner or to perform certain operations described herein.

Figure 3:
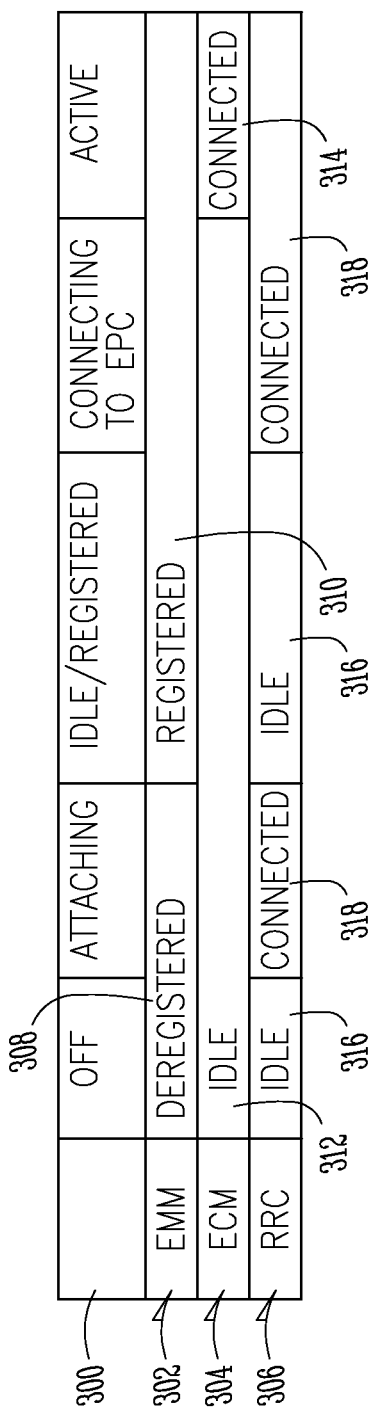
FIG. 3 illustrates UE states in accordance with some embodiments.

FIG. 3 is a block diagram of UE states in accordance with some embodiments. In the example of FIG. 3, UE (such as UE 116 or UE 118) has overall UE state description 300 along the top row (e.g. Off, Attaching, Idle/Registered, Connecting to EPC (Evolved Packet Core), Active). Also illustrated are states for illustrated for an EPS—Mobility Management (EMM) layer 302, an EPS—Connection Management (ECM) layer 304 and a Radio Resource Control (RRC) layer 306.

The EMM layer 302 has two states. When a UE is switched off or uses a different radio access network technology (e.g. GPRS or UMTS) it's state is EMM Deregistered 308. Once the UE sees an LTE network it tries to register and if successful the state is changed to EMM Registered 310. At the same time the UE is also assigned an IP address. As a consequence UE in EMM Registered state 310 always have an IP address. However, the EMM state is only influenced by UE management procedures such as Attach, Detach and Tracking Area Updates. While the UE is in EMM Registered 310, the network knows the location of the UE either on a cell level or a tracking area level. Which of the two depends on the connection management state machine described below.

When a UE is registered (EMM Registered state) it can be in two ECM states. While a data transfer is ongoing the UE is in ECM Connected state 314. For the UE this means that on the radio link a RRC connection is established. For the network, ECM connected 314 means that both the Mobility Management Entity (MME) and the Serving (User Data) Gateway (SGW) have a connection to the mobile device via the Si interface (the physical and logical link between the core network and the radio access network). In ECM connected state 314, the cell level knows the location of the mobile and cell changes are controlled by handovers.

If there is no activity for some time, the network can decide that it is no longer worthwhile to keep a logical and physical connection in the radio network. The connection management state is then changed to ECM idle 312. The use of the term "idle" does not mean the connection completely goes away. Logically, it is still there but the RRC connection to the UE is removed as well the Si signaling and data link. The UE continues to be EMM registered 310 and the IP address it has been assigned remains in place. In ECM idle state 312 the location of the UE is only known down to the tracking area level and the UE performs cell changes autonomously without any signaling exchanges with the network From the base station (eNB or the like) and UE point of view there is a lot of room for maneuvering between ECM connected 314 and ECM idle 312. While a lot of data is exchanged, the air interface can be fully activated for the UE so it has to continuously listen for incoming data. In times of lower activity or even no activity at all, the base station can activate a discontinuous reception (DRX) mode so the UE devices can power down its transceivers for some time. The power down cycles range from milliseconds to a few seconds (2560 msec in the current standard—the longest DRX cycle defined). For some embodiments, modifications to the DRX cycle are illustrated in FIG. 4 and discussed below.

From a UE point of view the main difference between being in ECM Connected state 314 with a DRX cycle the length of a paging interval and being in ECM Idle state 312 without a radio interface connection is how it's mobility is controlled. In ECM Connected state 314, handovers are performed. In ECM Idle state 312, UE can change its serving cell autonomously and only has to report to the network when it leaves the current tracking area. For many UE, the base station is likely to keep the UE in ECM Connected state 314 for as long as possible by using DRX so data transfers can be resumed very quickly before cutting the link entirely and setting the state to ECM Idle 312. Thus, power savings opportunities using DRX under the present standard are limited.

The RRC protocol is responsible for the main controlling functions between UE and eNB, for example radio bearer establishment, lower layer configuration and transfer of NAS information. This entails: 1) broadcasting system level information; and 2) maintaining connection layer bi-directional control. RRC has two states, RRC Idle 316 and RRC Connected 318. In the RRC Connected state 318, the RRC manages the transmission/reception of all UE and control data in the upload/download slots (UL/DL). In the RRC Idle state 316, RRC does various tasks for radio link management such as: 1) cell selection/reselection; 2) monitoring paging channels, acquiring system information broadcast in a cell. Under the current 3GPP standard, opportunities for power savings are limited, even during the RRC Idle state 416.

Figure 4:
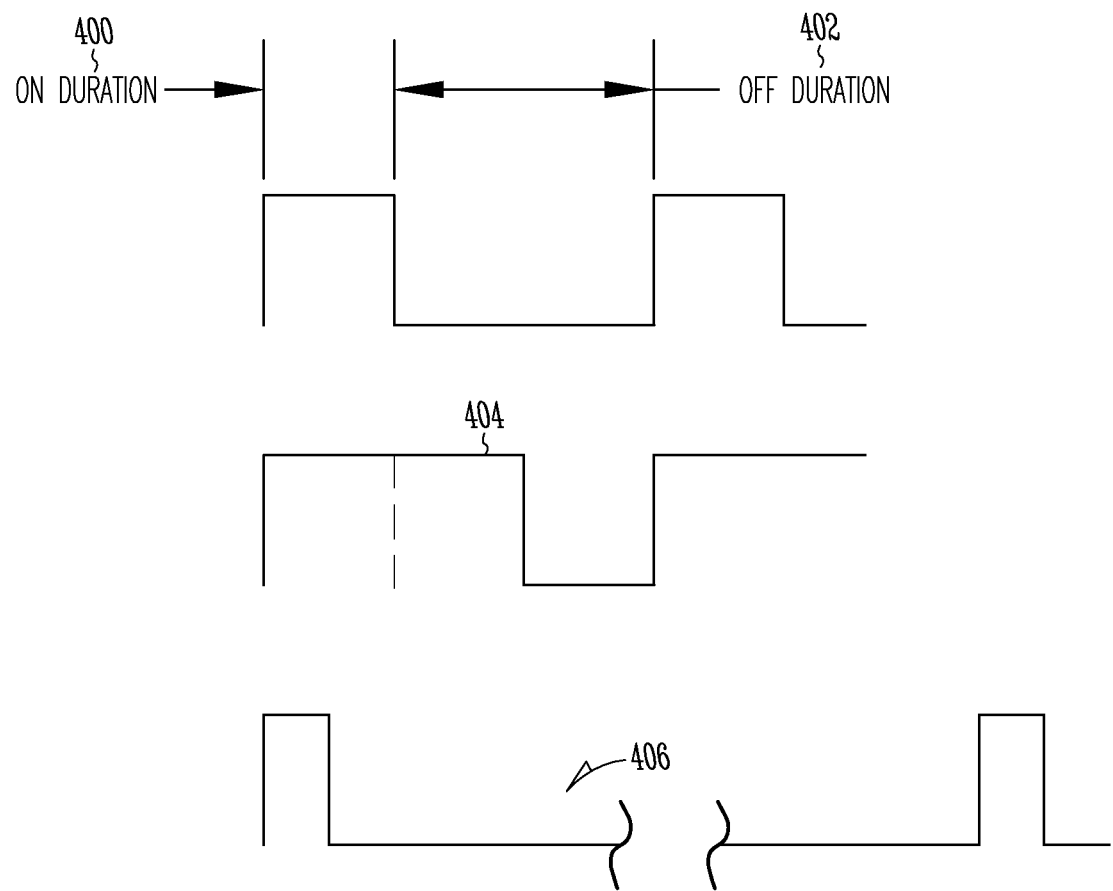
FIG. 4 illustrates various discontinuous reception cycles (DRX) in accordance with some embodiments.

FIG. 4 illustrates an example DRX cycle, according to some embodiments of the present invention. As illustrated in FIG. 4, the DRX cycle has an "on" time 400 and "off" time 402. During the off time, the UE is relieved of responsibilities such as monitoring PDCCH (DL control channel), in an attempt to save power. Due to decreases in overall bandwidth produced by a longer DRX cycle time, some UE characteristics may demand a shorter DRX cycle 404, rather than a long DRX cycle.

However, for certain UE characteristics, even the long DRX cycle may not provide sufficient power savings. Furthermore, a base station bias to keeping UE in the ECM Connected state adds to the problem. This is particularly true for UE with certain characteristics in mobility (e.g. nomadic), communication data load (e g infrequent periods of low amounts of data transfer), and/or communication type (e.g. MTC). Some MTC type examples are described in 3GPP TR 22.888, Study on Enhancements for MTC, and include smart grid, automotive, mobile rescue team, device-to-device type communications, cargo tracking, and other examples.

In situations where long DRX cycle do not provide sufficient power savings, a new DRX cycle 406 extends the "off" time to significant amounts of time, from the few seconds of the existing standard to multiple deci-hours or even longer in the case of appropriate UE. Such a new DRX cycle can be defined within the current DRX cycles and paging cycles or as part of a new Passive Paging message. Additionally, or alternatively, the new Passive Paging message (or changes to the current DRX cycles and paging cycles) may affect additional behavior of UEs, such as UE 116 and/or UE 118. In one example, Passive Paging messages (or changes to the current DRX cycles and paging cycles) allow the UE to make less frequent Radio Resource Management (RRM) measurements if the UE is stationary most of the time. Additionally, or alternatively, the Passive Paging message may reduce other procedures the UE may need to do, or change the data the UE keeps stored, depending on the characteristics of the UE.

According to some embodiments, a controlling entity, such as eNodeB 110 or eNodeB 112 of FIG. 1 or a MME, can receive (or otherwise know) UE characteristic information including mobility characteristic information and/or data transmission characteristic information (e.g. communication data load and/or communication type). Based on the UE characteristic information, the controlling entity can decide on a power savings configuration for the UE, which modify UE behavior while in the RRC idle state 316 and/or the ECM Idle state 308. Modifying the behavior of the UE while in the RRC Idle state 316 and/or ECM Idle state 312 can include modifying the DRX cycle time to be outside the parameters of the existing standard and/or modifying the work the UE performs (or data the UE keeps) during the RRC Idle state 316 and/or ECM Idle state 312. As noted above, these modifications may be communicated to the UE through a Passive Paging message, or a message according a current standard (e.g. current paging message or other message).

Figure 5:
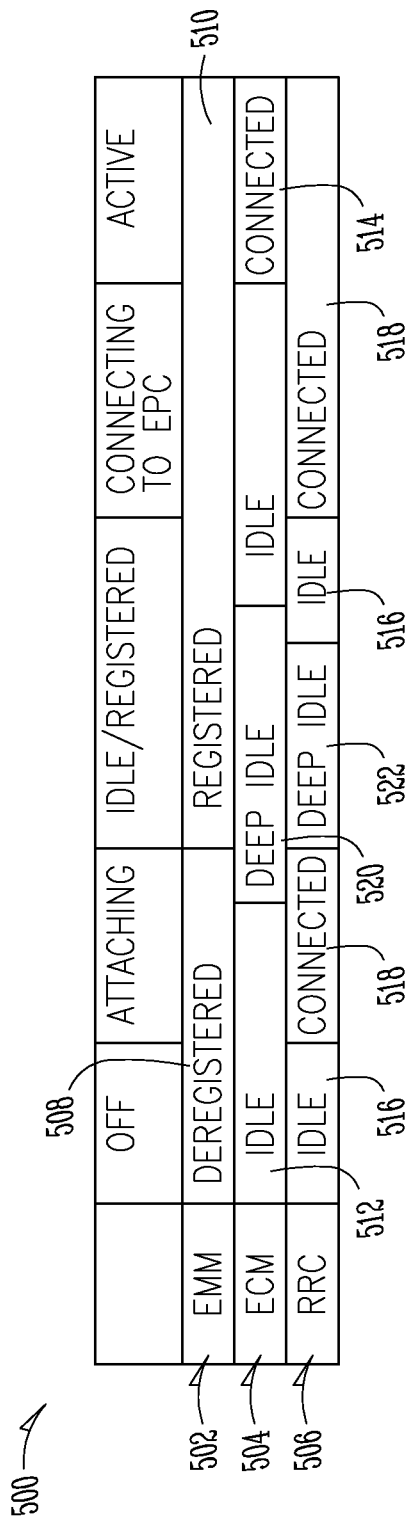
FIG. 5 illustrates UE states in accordance with some embodiments.

FIG. 5 is a block diagram of a UE in accordance with some embodiments. The example of FIG. 5 adds additional states to those described in FIG. 3, namely ECM Deep Idle state 520 and RRC Deep Idle state 522. These two states, either singly or in conjunction with one another, represent additional power savings functionality that can be utilized either alone or in conjunction with other power savings functionality as described above in conjunction with FIG. 3 and/or FIG. 4. ECM Deep Idle state 520 and/or RRC Deep Idle state 522 reduce the circuitry powered up, the data stored, the processing load (e.g. procedures performed) or some combination thereof, as described more fully below.

Figure 6:
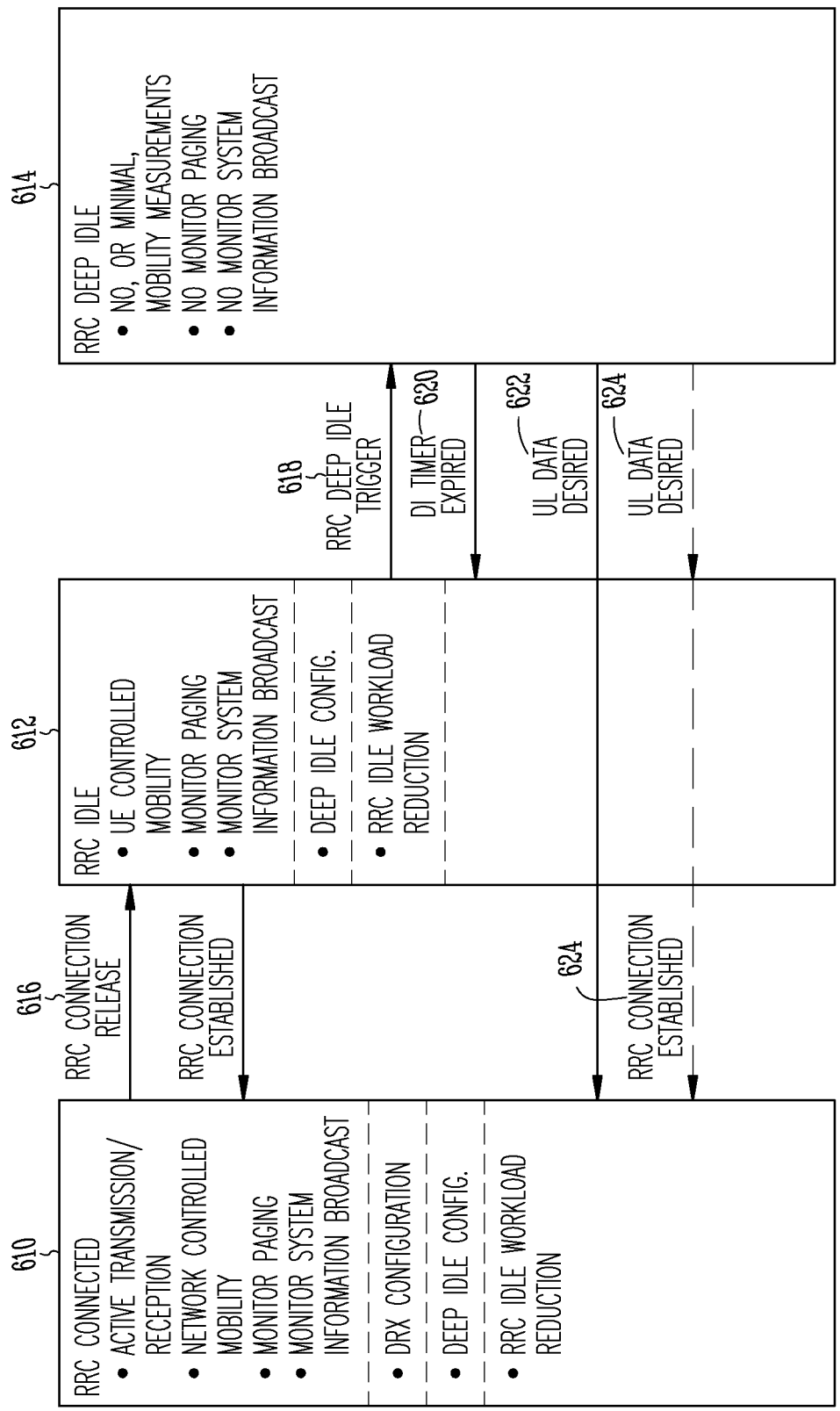
FIG. 6 illustrates UE state transition in accordance with some embodiments.

FIG. 6 illustrates examples of an RRC Deep Idle state (such as RRC Deep Idle state 522) and its relationship between an RRC Idle state (such as RRC Idle state 516) and an RRC Connected state (such as RRC Connected state 518) according to some examples in more detail.

FIG. 6 illustrates RRC Connected state 610. In this state, various UE activities can are performed. Examples of UE activities include active data transmission and/or reception, monitoring network paging activity, and/or monitoring system information broadcasts. In addition, the network controls mobility of the UE. Other optional activities can include DRX configuration (including an extended DRX cycle like 406 of FIG. 4), Deep Idle state 614 configuration (discussed more fully below), and configuration for RRC Idle state 612 workload reduction (e.g. reducing the procedures performed during RRC Idle state 614, and/or reducing the data or other information kept by UE while in the RRC Idle state 614).

The UE enters RRC Idle state 612 in a variety of ways, such as when RRC Connection Release (illustrated by 616) is received from an eNodeB (such as eNodeB 110 or eNodeB 112). While in RRC Idle state 612, the UE can perform various activities such as monitoring network paging activity, and/or monitoring system information broadcasts. The UE controls mobility in the RRC Idle state 612. Other optional activities or characteristics can include Deep Idle state 614 configuration (discussed more fully below). Finally, depending on the configuration of RRC Idle state 612, RRC Idle may reduce the procedures performed and/or the data or other information kept by the UE while in the RRC Idles state 614.

As examples of workload reduction (e.g. reducing the procedures performed and/or the data or other information kept by the UE), in situations where the UE has nomadic mobility or is stationary (perhaps in the case of a smart meter, network router, or other device that moves only occasionally or not at all), the normal cell selection/reselection procedures can be modified or eliminated all together. Modification can include either eliminating things that are typically done as part of the procedure (e.g. RRM measurements), or reducing the frequency and/or changing the methodology associated with them. As an example only, if a device is nomadic or stationary, mobility related procedures may only need to be rarely performed. Even then, cell selection may simply use the stored value of the prior cell (as that is the most likely location) until additional information illustrates a need for other cell selection procedures to be performed. Finally, it may be that security or other information normally kept and/or updated as part of the RRC Idle state 612 can be reduced or eliminated.

Transition from the RRC Idle state 612 or RRC Connected 610 to RRC Deep Idle state 614 can be based on a variety of triggers (illustrated by 618). One trigger may be information received as part of RRC Connection Release (like 616). Other triggers may be the expiration of an inactivity timer (which happens when there is no UL/DL data detected during the "on" portion of a DRX cycle), or expiration of a length of time or some other mechanism.

In RRC Deep Idle state 614, the intent is to reduce power consumption to a minimum. Therefore, various processing circuitry can be put in a low power or off position. During such time, no or perhaps reduced mobility measurements may be made, no paging may be monitored, and no system information broadcasts may be monitored, or combinations thereof. In one embodiment, transceiver and related processing circuitry are powered off. In another embodiment, provisions are made for paging or other information directed to the UE while in the RRC Deep Idle state 614. Such received information can be either discarded (such as when the transceiver and related circuitry is powered off) or retained in a buffer or other storage area for later processing when the UE transitions out of RRC Deep Idle state 614.

UE may transition out of the RRC Deep Idle state 614 in a variety of ways, depending on the particular example. In one example, transition from RRC Deep Idle 614 to RRC Idle 612 occurs upon expiration of a particular length of time (illustrated by 620). This length of time maybe configured either by a controlling entity (such as MME or eNodeB) or may be defined at the time of manufacture. Furthermore, it may be more or less static, depending on the characteristics of the UE, or may be dynamically configured to suit the characteristics and needs of the current time. In one example, the length of time is configured by an eNodeB as part of the RRC Connection Release. In another example, the length of time is configured by an eNodeB in a paging message (Passive paging or other paging). In yet another example, the length of time can be configured as part of an of Open Mobile Alliance Device Management (OMA-DM) procedure or as part of subscriber identity module, over-the-air (SIM-OTA) procedure or as part of an HLR/HSS subscription. In still another example, the length of time can be configured as part of a broadcast by an eNodeB for a special category of devices (perhaps those with certain mobility characteristic information and/or data transmission characteristic information (e.g. communication data load and/or communication type)).

Alternatively, or additionally, UE may transition out of the RRC Deep Idle state 614 when the UE has UL data that it determines should not wait until the expiration of the length of time. In such a situation, transition may be out of RRC Deep Idle state 614 to RRC Connected state 610 (illustrated by 622) or to RRC Idle state 612 and from there to RRC Connected state 610 (illustrated by 624).

Although not illustrated in FIG. 6, some embodiments may transition directly from RRC Connected 610 to RRC Deep Idle 614 or may pass through RRC Idle 612, either as part of a defined set of circumstances or as an alternative to transitioning from RRC Connected 610 to RRC Idle 612 and then to RRC Deep Idle 614.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

The term "computer readable medium," "machine-readable medium" and the like should be taken to include a single medium or multiple media (e.g., a centralized or distributed database, and/or associated caches and servers) that store the one or more sets of instructions. The terms shall also be taken to include any medium that is capable of storing, encoding or carrying a set of instructions for execution by the machine and that cause the machine to perform any one or more of the methodologies of the present disclosure. The term "computer readable medium," "machine-readable medium" shall accordingly be taken to include both "computer storage medium," "machine storage medium" and the like (tangible sources including, solid-state memories, optical and magnetic media, or other tangible devices and carriers but excluding signals per se, carrier waves and other intangible sources) and "computer communication medium," "machine communication medium" and the like (intangible sources including, signals per se, carrier wave signals and the like).

It will be appreciated that, for clarity purposes, the above description describes some embodiments with reference to different functional units or processors. However, it will be apparent that any suitable distribution of functionality between different functional units, processors or domains may be used without detracting from embodiments of the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. One skilled in the art would recognize that various features of the described embodiments may be combined in accordance with the invention. Moreover, it will be appreciated that various modifications and alterations may be made by those skilled in the art without departing from the scope of the invention.

What is claimed is:

1. A method to save power in user equipment (UE) comprising:
    receiving by a controlling entity, UE characteristic information describing mobility characteristics of a UE as one of either normal mobility associated with movable UE or nomadic mobility associated with UE that move occasionally or not at all;
    deciding by the controlling entity, based upon the UE characteristic information, on a power saving configuration comprising power saving parameters defining operation of the UE while in a RRC Deep Idle state, the power savings parameters controlling at least:
        power state of processing circuitry;
        mobility measurements performed by the UE; and
        handling of download data sent to the UE while in the RRC deep idle state; and
    sending the power saving configuration to the UE.

2. The method of claim 1 wherein the controlling entity is an enhanced Node B (eNB) and the configuration information is sent in a paging message.

3. The method of claim 1 wherein the controlling entity is an enhanced Node B (eNB) and the configuration information is sent in a new message.

4. The method of claim 1 wherein the controlling entity is a network operator and power saving configuration is performed as p art of Op en Mobile Alliance Device Management (OMA-DM) procedure or as part of subscriber identity module, over-the-air (SIM -OTA) procedure.

5. The method of claim 1 wherein the power saving configuration further controlling a discontinuous reception cycle (DRX).

6. The method of claim 1 wherein the UE characteristic information further comprises either normal data characteristics associated with non-Machine Type Communications (non-MTC) or limited data characteristics associated with Machine Type Communications (MTC).

7. The method of claim 1 wherein the UE characteristic information comprises nomadic mobility associated with UE that move only occasionally or not at all and limited data characteristics associated with Machine Type Communications and the power saving configuration comprises a time interval during which the UE will remain in the RRC Deep Idle state.

8. The method of claim 1 wherein the power savings parameters configure the UE to:
    take no or minimal mobility measurements;
    not monitor any paging messages; and
    not monitor any sy stem information broadcasts.

9. A method to save power in user equipment (UE) comprising:
    receiving by a UE, power saving configuration comprising:
        power saving parameters modifying a task normally performed by the UE while in a RRC Idle state such that the task that would otherwise be performed in an unmodified fashion while in the RRC Idle state has been changed; and
        power saving parameters modifying behavior of the UE while in a RRC Deep Idle state, the power saving parameters modifying the behavior of the UE while in a RRC Deep Idle state to at least:
            reduce the frequency of mobility measurements over the frequency of mobility measurements performed in the RRC Idle state;
            no monitoring of paging messages; and
            no monitoring of system information broadcasts; and
        configuring by the UE, processing circuitry so the behavior of the UE while in the RRC Idle state and the RRC Deep Idle state conform to the power saving configuration.

10. The method of claim 9 wherein the p ower saving parameters modifying the task reduce the frequency that the task is performed by the UE.

11. The method of claim 9 wherein while the parameters modifying the behavior of the UE while in the RRC Deep Idle state comprise a length of time for the Deep Idle state.

12. The method of claim 9 wherein the UE performs no Radio Resource Control (RRC) tasks while in the Deep Idle state.

13. The method of claim 9 further comprising sending to the controlling entity, UE characteristic information comprising:
    nomadic mobility; or
    infrequent transmission of small amounts of data; or
    both nomadic mobility and infrequent transmission of small amounts of data.

14. The method of claim 13 wherein the controlling entity is an eNB and the UE characteristic information is transmitted to the eNB as an establishment clause value in an RRC Connection Request.

15. User equipment (UE) comprising: processing circuitry to:
    receive, from a controlling entity, configuration information for a RRC Deep Idle state, the configuration information comprising power saving parameters defining operation of the UE while in the RRC Deep idle state, the power savings parameters controlling at least:
        power state of processing circuitry;
        mobility measurements performed by the UE; and
        handling of download data sent to the UE while in the RRC Deep idle state;
    Configure the UE according to the received power saving parameters;
    select Radio Resource Control (RRC) states comprising:
        a RRC Connected state allowing active transmission of data;
        a RRC Idle state allowing monitoring of Paging messages; and
        the RRC Deep Idle state; and a timer to measure a length of time, the expiration of which causes a state transition from the RRC Deep Idle state to the RRC Idle state.

16. The UE of claim 15 wherein the length of time is configured by an eNB.

17. The UE of claim 16 wherein the UE is configured to receive a Paging message from the eNB containing the length of time and the UE transitions from the RRC Idle state to the RRC Deep Idle state until expiration of the length of time.

18. The UE of claim 16 wherein the UE is configured to receive a RRC Connection release message from the eNB containing the length of time and the UE transitions from the RRC Connected state to the RRC Deep Idle state until the expiration of the length of time.

19. The UE of claim 15 wherein the length of time is configured by a manufacturer at the time of UE manufacture.

20. The UE of claim 15 wherein the processing circuitry transitions from the RRC Deep Idle state to the RRC Connected state up on determining that transmission of data should not be delayed until the expiration of the length of time.

21. The UE of claim 15 wherein the UE has nomadic mobility.

22. The UE of claim 15 wherein the UE is specifically adapted to Machine Type Communications.

23. User equipment (UE) comprising:
memory;
a processor coup led to the memory; and
instructions, stored in the memory, which, when executed cause the UE to:
  receive, from a controlling entity, configuration information comprising:
    RRC idle state power saving parameters that modify a task normally performed by the UE in a RRC idle state such that the task that would otherwise be performed in an unmodified fashion while in the RRC idle state has been changed; and
    Deep idle state power saving parameters that modify the behavior of the UE while in a RRC Deep Idle state to at least:
      Reduce the frequency of mobility measurements over the frequency of mobility measurements performed in the RRC Idle state;
      No monitoring of paging messages; and
      No monitoring of system information broadcasts;
    select among Radio Resource Control (RRC) states comprising:
    a RRC Connected state allowing active transmission of data;
    the RRC Idle state configured according to the received RRC Idle state power saving parameters; and
    the RRC Deep Idle state configured according to the received Deep Idle state power saving parameters.

24. The UE of claim 23 wherein the configuration information causes the UE to place DL data into a buffer to process when the UE transitions out of the RRC Deep Idle state.

25. The UE of claim 23 wherein the configuration information causes the UE to discard the DL data.

* * * * *